(12) United States Patent
Sanders et al.

(10) Patent No.: US 11,937,581 B2
(45) Date of Patent: Mar. 26, 2024

(54) LIGHTING SYSTEM FOR POULTRY HOUSES

(71) Applicant: Peco Foods, Inc., Tuscaloosa, AL (US)

(72) Inventors: Roddy Sanders, Tuscaloosa, AL (US); Steve Mclaurin, Tuscaloosa, AL (US); Cameron Sanders, Tuscaloosa, AL (US)

(73) Assignee: Peco Foods, Inc., Tuscaloosa, AL (US)

( * ) Notice: Subject to any disclaimer, the term of this patent is extended or adjusted under 35 U.S.C. 154(b) by 0 days.

(21) Appl. No.: 18/225,956

(22) Filed: Jul. 25, 2023

(65) Prior Publication Data
US 2024/0032511 A1    Feb. 1, 2024

Related U.S. Application Data (60) Provisional application No. 63/394,097, filed on Aug. 1, 2022.

(51) Int. Cl.
*A01K 31/22* (2006.01)
*F21V 21/008* (2006.01)
*F21V 21/15* (2006.01)

(52) U.S. Cl.
CPC ............ *A01K 31/22* (2013.01); *F21V 21/008* (2013.01); *F21V 21/15* (2013.01)

(58) Field of Classification Search
USPC .......................................... 119/437, 487–495
See application file for complete search history.

(56) References Cited

U.S. PATENT DOCUMENTS

| | | | | | |
|---|---|---|---|---|---|
| 2,314,344 | A | * | 3/1943 | Cornell | A01K 31/005 119/458 |
| 3,409,262 | A | * | 11/1968 | Soule | F21V 21/38 362/225 |
| 5,189,983 | A | * | 3/1993 | Aitchison | A01K 1/0011 119/302 |

(Continued)

FOREIGN PATENT DOCUMENTS

| CN | 208143916 U | 11/2018 |
|---|---|---|
| CN | 214508335 U | 10/2021 |

(Continued)

OTHER PUBLICATIONS

Lighting for Poultry Farms and Processing Plants, Joseph M. Zulovich, Department of Agricultural Engineering, University of Missouri, Aug. 1, 2005 [retrieved from the internet Oct. 3, 2023 https://www.thepoultrysite.com/articles/lighting-for-poultry-farms-and-processing-plants] 17 pages.*

*Primary Examiner* — Andrea M Valenti
(74) *Attorney, Agent, or Firm* — Breiner & Breiner, L.L.C.

(57) ABSTRACT

A lighting system for a poultry house is disclosed which includes a plurality of lights movable in the vertical direction, projecting light to different areas of the poultry house at prearranged times and projecting light of different intensity in the poultry house at prearranged times through the raising and lowering of the height of the lights. The lighting system provides adjustable parameters in the areas of the poultry house being lighted and the intensity of these areas across the interior of the poultry house. The system provides the poultry with migration options to areas of lower or higher light intensity, thereby improving management practices of the poultry.

8 Claims, 6 Drawing Sheets

(56) References Cited

U.S. PATENT DOCUMENTS

| | | | |
|---|---|---|---|
| 5,556,195 A * | 9/1996 | Glebe | F21V 21/38 362/418 |
| 7,475,512 B2 | 1/2009 | Van Den Dool | |
| 10,160,681 B2 | 12/2018 | Y Hu | |
| 10,292,340 B2 | 5/2019 | Berinsky | |
| 10,502,401 B2 | 12/2019 | Isayama | |
| 10,767,839 B2 | 9/2020 | Yang et al. | |
| 10,842,082 B1 | 11/2020 | Genga, Jr. et al. | |
| 10,980,187 B2 | 4/2021 | Conrad | |
| 11,240,970 B2 | 2/2022 | Lee | |
| 2009/0185375 A1* | 7/2009 | Nauman | F21V 17/007 362/249.14 |
| 2013/0283683 A1 | 10/2013 | Ringbom et al. | |
| 2015/0062893 A1* | 3/2015 | Lynn | F21V 7/00 362/231 |
| 2015/0351325 A1* | 12/2015 | Shelor | H05B 47/105 47/58.1 LS |
| 2018/0352755 A1 | 12/2018 | Szoradi et al. | |
| 2019/0195478 A1 | 6/2019 | Hayrapetian | |
| 2021/0032082 A1* | 2/2021 | Chacon | B66D 1/38 |
| 2023/0034181 A1* | 2/2023 | DuFresne | F21V 21/15 |

FOREIGN PATENT DOCUMENTS

| | | | | |
|---|---|---|---|---|
| KR | 200302101 | * | 1/2003 | F21V 21/36 |
| KR | 10-20190045597 A | | 5/2019 | |
| WO | PCT WO 0234039 | * | 5/2002 | A01K 45/00 |

* cited by examiner

LIGHTING SYSTEM FOR POULTRY HOUSES

RELATED APPLICATION

This application claims benefit of U.S. Provisional Application Ser. No. 63/394,097, filed Aug. 1, 2022, entitled "Lighting System For Poultry Houses," which application is incorporated herein by reference in its entirety.

FIELD OF THE INVENTION

The present invention relates to a lighting system for a poultry house. More particularly, the invention relates to a lighting system for a poultry house having a plurality of lights wherein the lights are manually adjusted or automatically programmed to move the lights up and down in relation to the floor of the poultry house; to direct light to different areas of the poultry house at prearranged times; and to direct light having different intensities by the raising and lowering of the lights.

BACKGROUND OF THE INVENTION

Lighting in poultry houses is important to poultry production. Important factors include the intensity of the lighting and the timing of the lighting. The lighting systems in known commercial poultry houses are in a fixed vertical location in the ceilings inside the poultry houses, and having a fixed horizontal spacing, i.e., the distance between bulbs and distance from side walls of the house. The operation of the lighting systems is controlled with electronic control systems changing the lighting run-time and intensity by days of poultry production or by the age of the poultry. These known lighting systems stimulate physical activity and resting periods for the poultry, based on days of poultry age and the best management practices for performance and animal welfare.

SUMMARY OF THE INVENTION

A primary object of the invention is to provide a lighting system for poultry houses having a plurality of lights wherein the lights are suspended above the poultry and have a height adjustment controller to selectively raise and lower the lights.

Another primary object of the invention is to provide a lighting system for poultry houses which may light different areas of the poultry house at different prearranged times, which lights may be selectively raised and lowered.

Another primary object of the invention is to provide a lighting system for poultry houses wherein the lights may be adjusted to different intensities over different prearranged periods of time by moving the lights vertically up and down.

Another primary object of the invention is to provide a lighting system for poultry houses wherein there are two or more lines of lights and the different lines of lights may be adjusted to different heights to provide a different amount of light and/or a different intensity of light to different areas or zones of the poultry house.

Another primary object of the invention is to provide a lighting system for poultry houses wherein the lights may also be moved horizontally over, for example, the feeders in the poultry house.

Another primary object of the invention is to provide a lighting system for poultry houses wherein the lighting system may also be used for brooding baby chicks as well as rearing of poultry.

Another primary object of the invention is to provide a lighting system for poultry houses which provides options in the adjustment of the lighting system to facilitate research in the best management practices in rearing poultry.

The present invention is directed to a lighting system for a poultry house to control the amount of light and the intensity of light available to poultry in the poultry house comprising at least one line of a plurality of lights adapted to be raised and lowered to control the amount of light and the intensity of light provided to the poultry in the poultry house.

The present invention is further directed to a lighting system for a poultry house comprising a plurality of lights movable in the vertical direction, projecting light to different areas of the poultry house at prearranged times and projecting light of different intensity in the poultry house at prearranged times through the raising and lowering of the height of the lights. The plurality of lights includes a winch assembly operated manually or automatically through an electronic system to move the lights up and down. This provides adjustable parameters in the areas being lighted and the intensity of these areas across the interior of the poultry house. The intensity of the lights may be further controlled by a dimmer. The invention provides the poultry with migration options to areas of lower or higher light intensity, and improving management practices of the poultry.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings.

DETAILED DESCRIPTION OF THE PREFERRED EMBODIMENTS

The invention is directed to a lighting system for a poultry house comprising a plurality of lights movable in the vertical direction, projecting light to different areas of the poultry house at prearranged times and projecting light of different intensity in the poultry house at prearranged times through the raising and lowering of the height of the lights. The plurality of lights include a fixture and a bulb and winch assembly. The winch assembly may be operated manually or automatically through an electronic system to move the lights up and down. This provides adjustable parameters in the areas being lighted and the intensity of these areas across the interior of the poultry house. The intensity of the lights may be further controlled by a dimmer. The invention provides the poultry with migration options to areas of lower or higher light intensity. This improves management practices of the poultry.

Figure 1A:
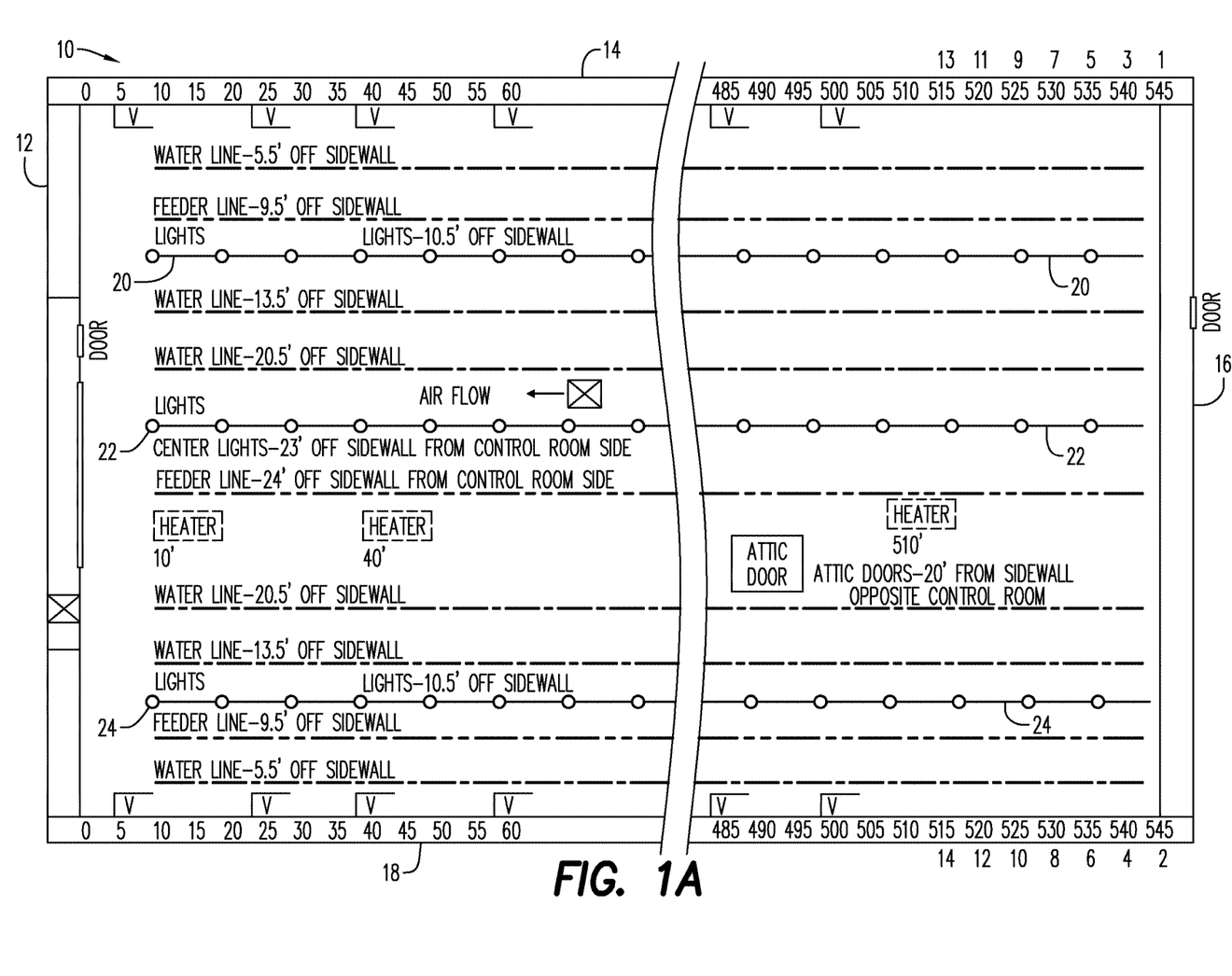
FIG. 1A is a partial plan view of one embodiment of the lighting system for a poultry house of the present invention.

Referring to FIG. 1A, there is shown a partial plan view of a poultry house 10 using a first preferred embodiment of the invention at the Mississippi State University South Farm Research Facility. Poultry house 10 includes a first end wall 12, a first side wall 14, a second end wall 16 and a second side wall 18. The poultry house 10 is an enclosed building with a pitched roof and generally having no natural light. FIG. 1A shows the plurality of lights and their location in relation to the different areas of the poultry house. The poultry house 10 is approximately 545 feet in length and approximately 50 feet in width, although these dimensions may vary. There are three lines of lights 20, 22 and 24 extending from one end of the poultry house to the other end of the poultry house. In this embodiment, the lights in each line are spaced approximately ten feet apart and there are 54 lights in each line. The first line of lights 20 is approximately 10.5 feet off of the first side wall 14; the second line of lights 22 is approximately 23 feet off of the first side wall 14; and the third line of lights 24 is approximately 10.5 feet off of the second side wall 18. Additionally, there are water lines and feeder lines for providing water and feed to the poultry. There is a first water line approximately 5.5 feet off the first side wall 14; a second water line approximately 13.5 feet off of the first side wall 14; a third water line approximately 20.5 feet off the first side wall 14; a fourth water line approximately 5.5 feet off of the second side wall 18; and a fifth water line approximately 13.5 feet off of the second side wall 18. There is a first feeder line approximately 9.5 feet off of the first side wall 14; a second feeder line approximately 24 feet off of the first side wall 14; and a third feeder line approximately 9.5 feet off of the second side wall 18. There are also a plurality of heaters spaced approximately 30 feet apart running down the center of the poultry house and, in a preferred embodiment, 15 heaters.

Figure 1B:
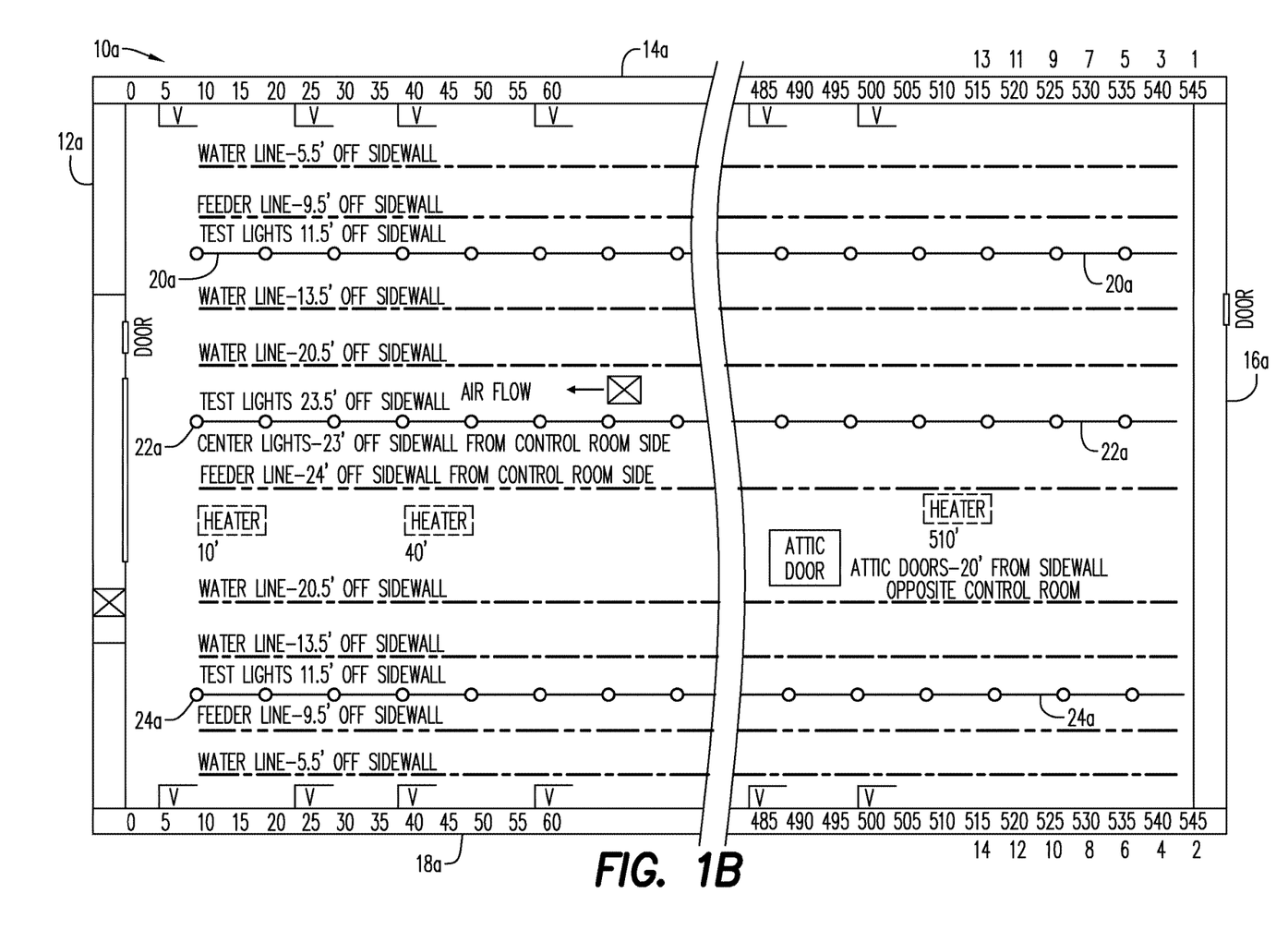
FIG. 1B is a partial plan view of a second embodiment of the lighting system for a poultry house of the present invention.

Referring to FIG. 1B, there is shown a partial plan view of a poultry house using a second embodiment of the invention at the Peco Foods Pocahontas Arkansas Poultry Facility. This embodiment is substantially the same as in FIG. 1A with the exception of the spacing of the lines of lights 20A, 22A and 24A lights. In this embodiment, the first line of lights 20A is approximately 11.5 feet off of the first side wall 14A; the second line of lights 22A is approximately 23.5 feet off of the first side wall 14A; and the third line of lights 24A is approximately 11.5 feet off of the second side wall 18A.

While the invention has been described with respect to the poultry houses in FIGS. 1A and 1B, it is understood that different size poultry houses may use the invention without departing from the scope of the invention, e.g. poultry houses 40 feet to 66 feet in width. Accordingly, the number of lines of lights and the number of lights may vary depending on the size of the poultry house. For example, in a small poultry house, e.g. 35 feet in width, only two lines of lights may be required.

Figure 2A:
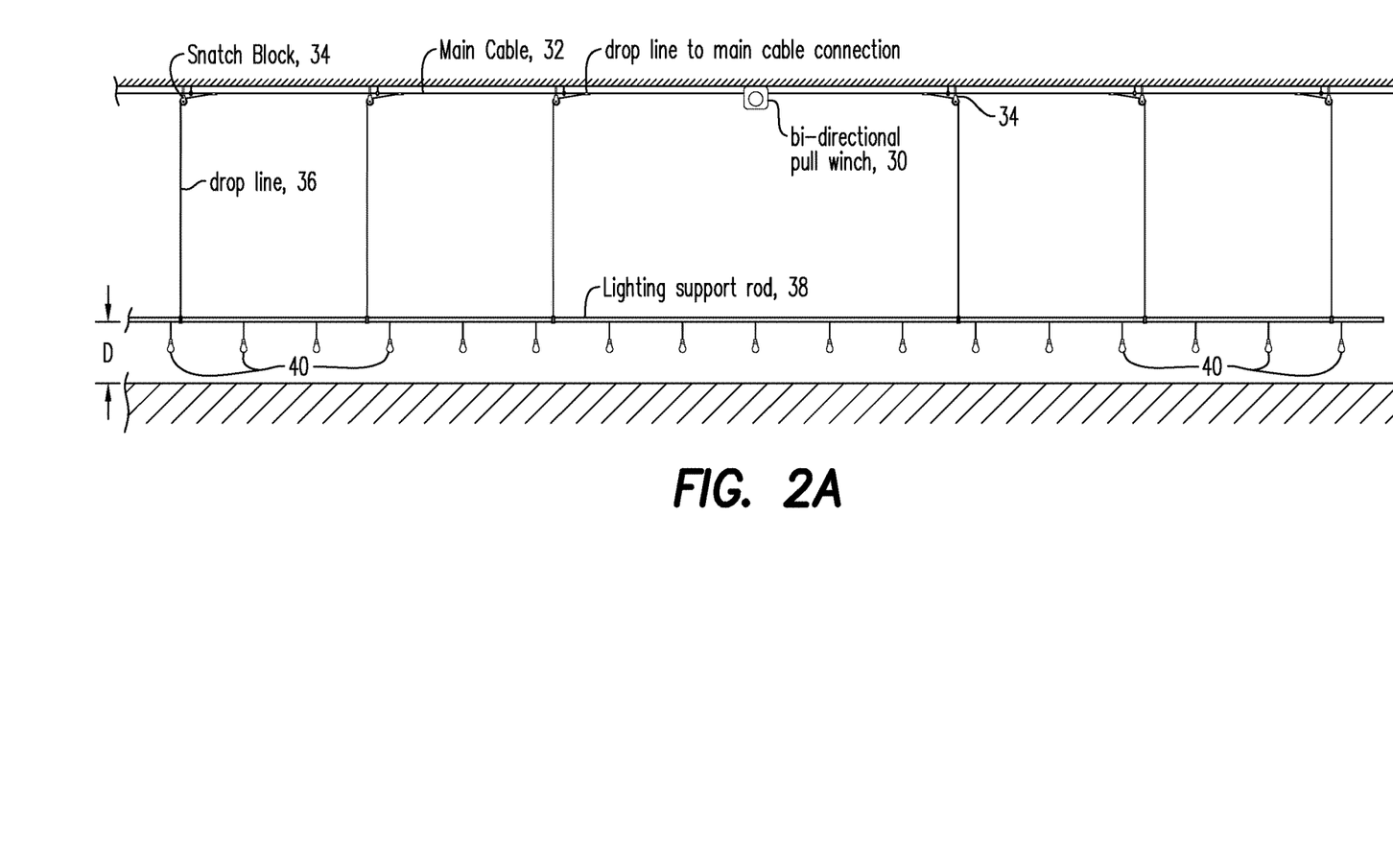
FIG. 2A is a presently preferred embodiment of the lighting system of the invention with the lights in a lowered position.
Figure 2B:
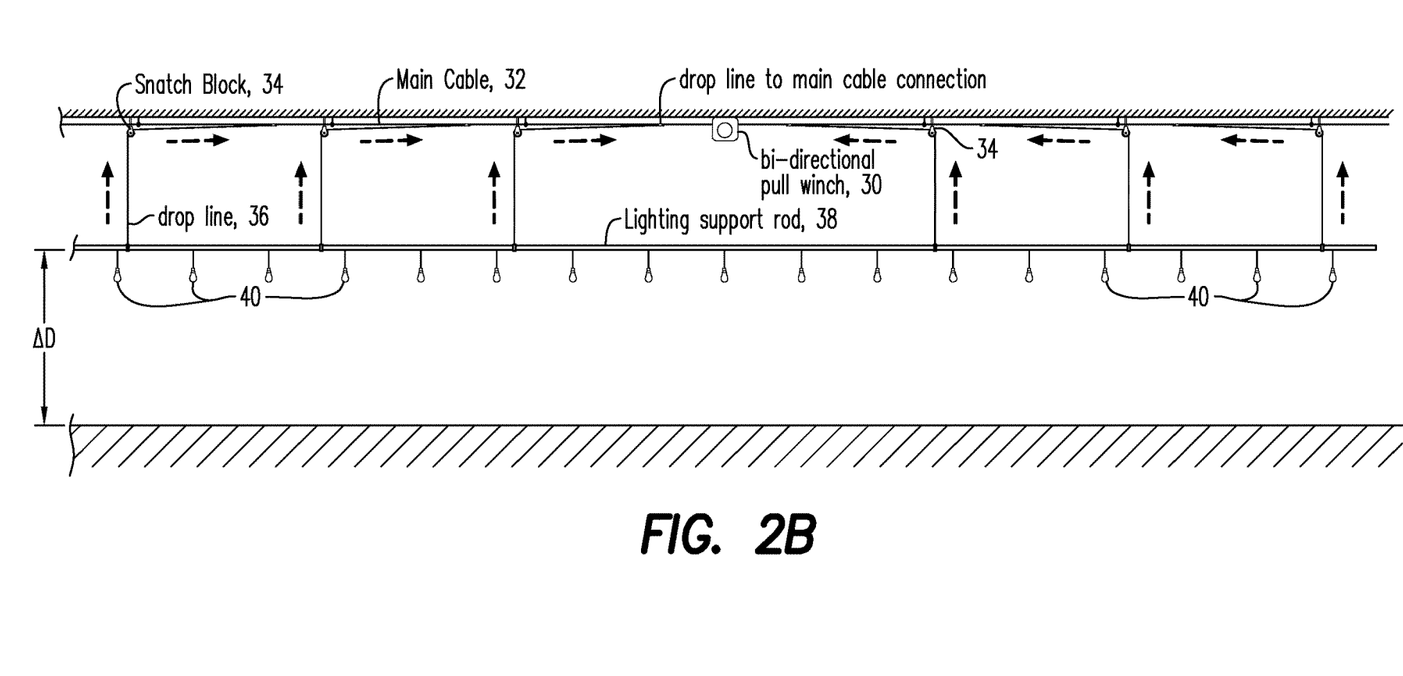
FIG. 2B is the embodiment of FIG. 2A with the lights in a raised position.
Figure 3:
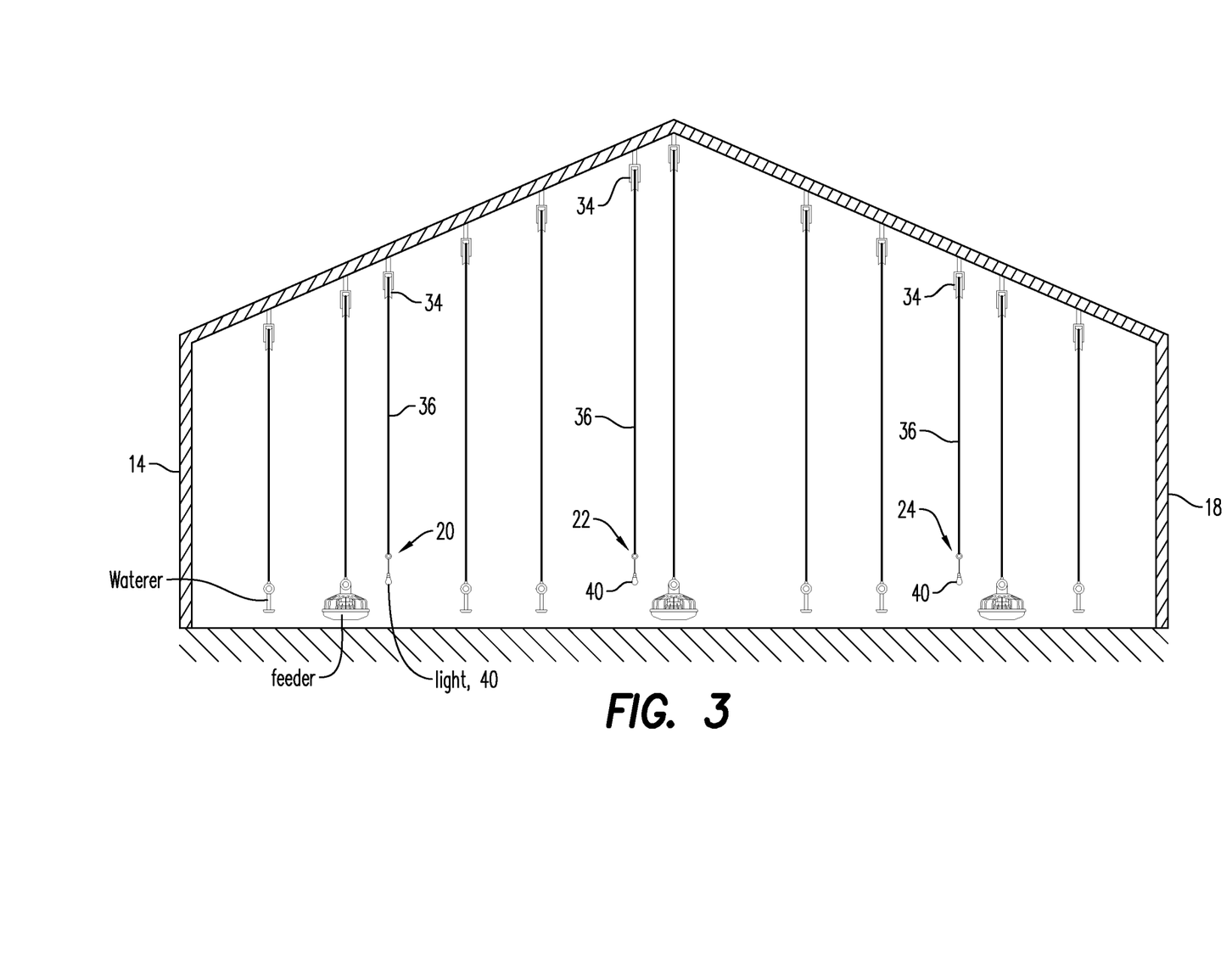
FIG. 3 is an end view of a poultry house as generally shown in FIGS. 1A and 1B and the lighting system.

Referring to FIGS. 2A, 2B and 3, there is shown a presently preferred embodiment of the lighting system used in the poultry houses of FIGS. 1A and 1B. The assembly for raising and lowering the lights in each of lines 20, 22 and 24 includes a bidirectional pull winch 30, a main cable 32, a snatch block or pulley 34, light drop lines 36, a lighting support rod 38 and a plurality of lights 40. In some embodiments, there are two pull winches, one for a first half of the poultry house and a second for a second half of the poultry house. The winch assembly raises and lowers the lights. FIG. 2A shows the lights in a lowered position and FIG. 2B shows the lights in a raised position. While it is understood that the distance of the lights from the ground of the poultry house may be any distance as required by the best management practices in raising the poultry, a preferred range is about 96 inches to about 16 inches.

Referring to FIG. 3, there is shown an end view of the lighting system as generally shown in the FIGS. 1A and 1B poultry houses. The poultry house has multiple separate areas for the poultry to migrate from a dark area to a lighted area. The winch assembly as shown in FIGS. 2A and 2B allows the lights to move up and down in relation to the specific areas of the poultry house, thereby providing different intensity of light to the different areas of the poultry house. As seen in the FIG. 3, three areas of the poultry house are lit by lines 20, 22 and 24, and the remaining areas are not lit. While FIG. 3 shows the lights 40 at the same height, it is understood that lines 20, 22 and 24 may be at different heights to provide a different amount of light and/or a different intensity of light under each area or zone of lines 20, 22 and 24. Accordingly, the lights may be adjusted according to the user's preference with respect to the physical activity or resting periods of the poultry during poultry production.

The light bulbs are preferably 8 to 10 Watt LED bulbs. However, the light bulb wattage may vary based on numerous factors and is subject to best management practices of the poultry. The intensity of the lights over the poultry is controlled by the raising or lowering of the lights, and may be further controlled by a dimmer.

The lighting system is preferably automatically controlled by an electronic control system to (1) light specified areas of the poultry house at specified times during the day; (2) to raise and lower the lights at specified times during the day to increase or decrease the light intensity; (3) to further control the lights intensity by use of a dimmer; and (4) to adjust these specified times during a day throughout a week or longer. The lighting is adjusted based on best practices of raising the poultry, including age of the poultry and the poultry production time.

Figure 4:
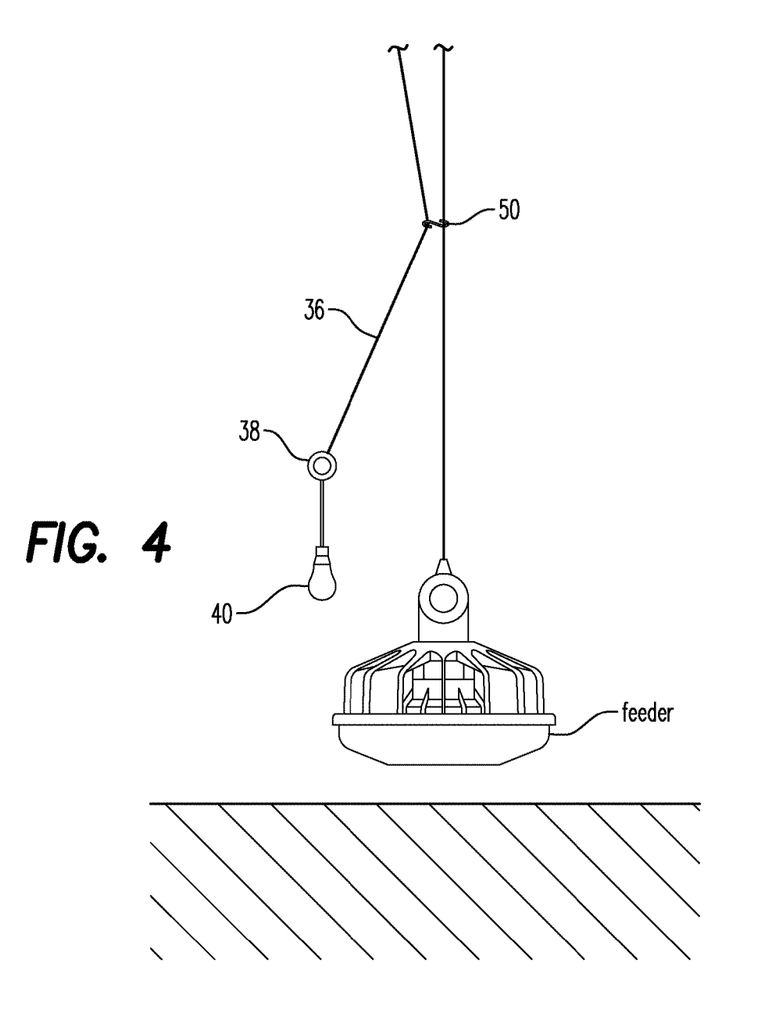
FIG. 4 shows the lighting system of FIGS. 1-3 using an S-Hook to move the light over a feeder.

In some instances, it is preferred to have the lights placed directly over the feeders. When this is desired, the lights are moved over the feeder by use of an S-Hook 50 attached to a light drop line and connected to a feeder drop line, as shown in FIG. 4.

An example of a program for the lighting system used at the Peco Foods Pocahontas Facility shown in FIG. 1B is as follows:

| Day | Height (") | Light Intensity | Dark Period (hrs) |
| --- | --- | --- | --- |
| Day 1-7 | 72" | Full | 0 |
| Day 8 | 36" | 75% | 6 |
| Day 9-14 | 4" above feeder | 75% | 6 |
| Day 14-42 | 4" above feeder | 60% | 6 |
| Day 43-24 hrs prior to sell | 4" above feeder | 60% | 4 |
| 24 hrs prior to sell | 4" above feeder | 60% | 0 |

Accordingly, in the early stages of the poultry production, the lights are in a raised position and lowered in the later stages of the poultry production. The intensity of the light will increase in the later stages when the lights are lowered.

The light intensity may also be controlled by a dimmer as seen in the later stages of the poultry production.

The ability to raise and lower the lights of the lighting system inside a poultry house also provides for a safe, an ergonomic and an economical method for the cleaning and maintenance of a commercial poultry house lighting system.

The lighting system of the invention provides improvements in poultry management and animal welfare.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A method of poultry production in a poultry house comprising controlling the amount of light and the intensity of light available to poultry during a poultry production cycle by a lighting system comprising a poultry house having a ceiling and a floor, at least one line of a plurality of feeders, at least one line of a plurality of lights adapted to be raised and lowered in relation to the floor of the poultry house and the plurality of feeders, and the plurality of lights adapted to control the amount of light and the intensity of light provided to the poultry at the plurality of feeders at predetermined times during the poultry production cycle; suspending from the ceiling the at least one line of plurality of lights approximately a foot away in a horizontal direction from a respective at least one line of a plurality of feeders; adjusting a vertical height of the at least one line of a plurality of lights into a raised position for at least the first seven days of the poultry production cycle and thereafter lowering the at least one line of lights to a position closer to the at least one line of feeders for the later stages of the poultry production cycle; wherein improving poultry management and animal welfare.

2. The method of poultry production according to claim 1 wherein the at least one line of the plurality of lights is raised and lowered by a winch assembly comprising
a bi-directional pull winch,
a cable attached to the winch,
a plurality of light drop lines connected to the cable and attached to a light support rod,
the plurality of lights are attached to the light support rod, and
an electronic system or a manual system to control the winch to raise and lower the light drop lines.

3. The method of poultry production according to claim 2 wherein the electronic system further includes a dimmer to dim the lights.

4. The method of poultry production according to claim 1 wherein there are three lines of lights.

5. The method of poultry production according to claim 4 wherein the three lines of lights are adapted to be independently raised and lowered to provide a different amount of light and/or a different intensity of light to the poultry in each respective zone.

6. The method of poultry production according to claim 5 wherein the poultry house is about 40 feet to about 50 feet in width.

7. The method of poultry production according to claim 6 wherein the first line of lights is about 10 feet to about 12 feet off of a first side wall of the poultry house, the second line of lights is about 20 feet to about 25 feet off of the first side wall of the poultry house, and the third line of lights is about 10 feet to about 12 feet off of a second side wall of the poultry house.

8. The method of poultry production according to claim 1 wherein the at least one line of feeders are hung from the ceiling of the poultry house by feeder drop lines and at least one or more lights of the at least one line of a plurality of lights is adapted to be held over at least one or more feeders by an S-Hook connected to a light drop line and to the feeder drop line.

* * * * *